United States Patent [19]

Wass et al.

[11] Patent Number: 4,811,871

[45] Date of Patent: Mar. 14, 1989

[54] LIQUID DOSING DEVICE

[75] Inventors: Anthony Wass, Stamford; Brian Law, Leicester, both of Great Britain

[73] Assignee: The English Glass Company Limited, United Kingdom

[21] Appl. No.: 131,677

[22] Filed: Dec. 11, 1987

[30] Foreign Application Priority Data

Dec. 17, 1986 [GB] United Kingdom ................. 8630207
Apr. 2, 1987 [GB] United Kingdom ................. 8707862
Aug. 19, 1987 [GB] United Kingdom ................. 8719553

[51] Int. Cl.$^4$ .............................................. B65D 47/00
[52] U.S. Cl. ..................................... 222/477; 222/212; 222/456; 222/500; 222/501; 222/547; 222/548
[58] Field of Search ............... 222/476, 477, 212, 213, 222/500, 501, 322, 456, 564, 547, 559, 504, 449, 544, 545, 548

[56] References Cited

U.S. PATENT DOCUMENTS

| | | | |
|---|---|---|---|
| 1,279,014 | 9/1918 | Schimel | 222/500 X |
| 2,331,659 | 10/1943 | Cutone | 222/445 |
| 2,581,897 | 1/1952 | Allen | 222/500 X |
| 2,582,026 | 1/1952 | Friedman | 222/500 |
| 2,919,056 | 12/1959 | Collins | 222/477 |
| 3,146,919 | 9/1964 | Chappell | 222/500 X |
| 3,156,386 | 11/1964 | Kuechenmeister | 222/477 X |
| 3,321,113 | 5/1967 | Conry | 222/477 |
| 3,558,022 | 1/1971 | Zytko | 222/490 |
| 3,567,079 | 3/1971 | Weigand | 222/500 X |
| 4,728,011 | 3/1988 | Schuster | 222/456 X |

FOREIGN PATENT DOCUMENTS

| | | |
|---|---|---|
| 366815 | 1/1923 | Fed. Rep. of Germany . |
| 2544671 | 4/1977 | Fed. Rep. of Germany . |
| 3303562 | 8/1984 | Fed. Rep. of Germany ...... 222/477 |
| 133323 | 3/1921 | United Kingdom . |
| 1210173 | 10/1970 | United Kingdom . |
| 1537699 | 1/1979 | United Kingdom . |
| 2053420 | 2/1981 | United Kingdom . |

Primary Examiner—Kevin P. Shaver
Attorney, Agent, or Firm—Stevens, Davis, Miller & Mosher

[57] ABSTRACT

A dosing device for dispensing liquid from a container comprises an outlet passage for the liquid and an obturator, such as a flap or piston, that is adapted to be driven to block the outlet passage, once a quantity of liquid has been dispensed, under the influence of liquid flowing from the container through a small aperture into a space behind the obturator in a chamber in which the obturator is movable. The outlet passage has a convoluted configuration whereby flow of liquid through it is directed at least partly back towards the obturator to exert a back-pressure thereon, the obturator being of a dimension such that it may be acted on by liquid in part of the passage in which the flow is thus directed back. The chamber may have a moveable wall portion that opens up a large aperture to allow rapid restoration of the obturator to its start position.

17 Claims, 7 Drawing Sheets

LIQUID DOSING DEVICE

FIELD OF THE INVENTION

The invention relates to devices for providing metered doses of liquid from a container, and to containers incorporating such devices. Although particularly applicable to containers from which liquid is dispensed by squeezing or by pressurizing the container contents in some other way, it may be used for containers from which liquid is poured under its own pressure alone.

BACKGROUND OF THE INVENTION

It is known to have a metering device in the neck of a container with a movable closure member, such as a piston or valve, that can move towards the container outlet when dispensing in order to shut it off after a short period of time. Commonly the closure member has been carried to the blocking-off position by the outflowing liquid itself, and/or by gravity when the container is inverted. In some devices however the closure member may be substantially isolated from the main outflow of liquid from the container, e.g. it will be a ball or piston working in a cylinder as seen in for example GB-A No. 1 210 173 (Emil von der Crone) and U.S. patent application No. 1279014 (Schimel). In this case the amount dispensed depends on the pressure of the liquid and on the time taken for the piston to fall, but not on the volume that the piston sweeps out. The problem of controlling the speed of movement of the closure member is addressed by providing a small regulator hole in the cylinder base and having a heavy ball/piston that is a close fit in the cylinder, so that on inversion of the container the fall under gravity of the ball/piston is braked by the rate at which the liquid can flow through the regulator hole to fill the space behind it. These prior devices however have the disadvantage that they are complex and uneconomical to make, particularly with regard to the need to have the piston/ball an accurate clearance fit in the cylinder.

SUMMARY OF THE INVENTION

According to one aspect of the present invention, a dosing device has a front part with an outlet opening, an outlet passage for liquid and an obturator, such as a flap or piston, for blocking off the outlet passage to provide a measured dosing effect. The obturator moves in a chamber in the wall of which there is at least one small aperture providing access to the chamber from the main body of a container from which liquid is to be dispensed, so that the controlled or restricted flow of liquid through the aperture drives the obturator in the chamber forward towards the outlet opening during dispensing. The main outlet passage path taken by dispensed liquid travelling to the outlet is around the chamber, so that the amount discharged depends on the time taken for the obturator to close and not on the volume that it sweeps out in the chamber. In turn, this time depends for a given liquid on the size of the aperture or apertures in the chamber wall behind the obturator, and on a back pressure that is produced on the front of the obturator during dispensing by having a convoluted configuration of the outlet passage. This convolution, produced preferably by having a rearwardly extending part or parts on the front part, causes the back pressure by directing the flow of liquid being dispensed back against the front of the obturator, which is of a dimension such as to be acted on by liquid in that part of the outlet passage in which flow is thus reversed.

By using a convolution in the outlet passage to produce a back pressure on the obturator the dependence of the dose size on the pressure exerted on the liquid, e.g. the squeeze pressure in a squeeze bottle, may be reduced. Also, because the volume dispensed is not swept out in the dosing device itself, it is not necessary to provide a large device in order to obtain a large dose.

The convolution may be provided by having a rearwardly projecting portion with a radially outwardly-facing surface, extending back towards the obturator from around the outlet hole of the device. This could be for example a tubular portion that defines the outlet hole and projects from a plate forming the front part of the device (e.g. the top of the closure of a container neck) back towards the obturator. It is also preferred that the obturator can block off by sealing against this projecting portion.

Preferably the device is configured so that flow of dispensed liquid to the outlet is around the sides of the chamber and then radially inwardly past the periphery of an open front end thereof towards the projecting outlet portion. The latter preferably projects back sufficiently far in the outlet axial direction to overlap or at least to reach the forward axial extent of this front chamber opening, so as to enhance direction of flow through the outlet passage back against the obturator. The portions of the device forming the chamber wall may be bridged to the rest of the device by a number of spaced legs between which are defined apertures of window regions for liquid being dispensed to pass through. In one version the device may comprise two relatively rotatable parts, one (preferably one fixed relative to the container) carrying these spaced legs forming the window regions and the other having shutter portions that can be rotated so as to cover the apertures to varying degrees. This enables the dispensing flow rate through the outlet passage —and hence the size of dose dispensed—to be varied easily e.g. by rotation of a container cap integral with or connected to one of these parts, without need for varying the size of the small aperture(s) in the chamber wall.

The obturator used in the device may be a piston movable essentially linearly in a cylinder, this preferably being aligned axially with the outlet opening and with the small aperture at the end of the cylinder distal from the outlet. To keep down friction in operation it is preferred that the main body of the piston be relatively flat, i.e. axially short compared with its dimension across the cylinder. Means may then be provided for preventing tipping of the piston axis in the cylinder, such as a stem on the piston projecting forwardly through the outlet and carrying longitudinal fins or splines that are guided by the outlet while allowing passage of liquid between them. Preferably however the piston has at least one axially projecting guide portion for maintaining the alignment of its axis in the cylinder by engagement with an alignment part or parts of the device that is/are all substantially spaced from the exterior opening of the outlet. Each guide part should have small transverse cross-section relative to the piston and only a small area of contact, if any, with the stationary part(s) so that any tendency for drying-out of liquid to stick the piston in the cylinder is reduced, as well as friction. The spacing from the outlet tends to reduce the chance of drying-out affecting the engaging guide portions.

To be guided in this way the piston may have a thin central stem projecting forward into the outlet and guided along a central path spaced from the outlet walls by a guide opening defined by one or more of radially inward guide projections, e.g. a plurality of prongs, extending radially inward from the wall of a tube defining the outlet, but at an end of the tube substantially spaced from its exterior opening. Additionally or alternatively the piston may have a plurality of fins spaced around its periphery and projecting axially beyond its main piston body to engage the cylinder wall and provide the stability of a longer piston without the degree of extra friction that a longer full piston would cause.

Instead of a linearly-moving piston, the obturator may be a flap that is restrained in the device in such a way as to be able to make swinging or pivotal movement between a position closing off the outlet and an open position. It may be a loose separate flap trapped at one edge so as to be able to pivot, or integrally formed as a one-piece hinged moulding with a stationary part of the device.

Another problem to be solved in relation to obturator-control dosing devices is that of providing rapid restoration of the obturator to its starting position after each dose, so that waiting time between doses is kept down. One way of doing this is by having a projecting stem on the front of a piston obturator, as described above; when in the shut-off position this stem may project from the outlet opening and be used to push the piston back down to the inner end of its chamber, forcing liquid in the chamber back out through the small aperture. However, it may not always be convenient to have a projecting stem, and in any case the speed of restoration is still limited by the speed at which the small aperture permits liquid to be pushed out.

In another aspect, therefore, the invention proposes a dosing device for dispensing liquid, comprising a front part having an outlet opening, an outlet passage for the liquid and an obturator adapted to be driven to block the outlet passage by a restricted flow of liquid into a space behind the obturator in a chamber in which the obturator is movable, wherein that part of the device for defining the chamber comprises a movable wall portion. During dispensing this movable wall portion is adapted to take up a first position in which access to space in the chamber behind the obturator is restricted as aforesaid e.g. through one or more small apertures only. When however dispensing stops the wall portion is adapted to move, e.g. under gravity when the device is restored to an upright condition, to a second position providing a substantially larger aperture so that liquid around the obturator can fall rapidly back down into the container.

Preferably the small aperture is in the movable wall portion itself, although it may instead if desired be defined in a stationary wall portion, or between the edges of movable and stationary wall portions by having these with respective conformations that do not fit exactly together.

The movable wall portion may be separate from the rest of the device, but retained on it by retaining and guide means adapted to guide it to its closed position when dispensing and allow it to move to open up said larger aperture when not dispensing, although preventing it from becoming completely free of the device. Alternatively the movable portion may be hinged to the rest of the device so as to be able to pivot away from it to open up the larger aperture. In either case it is preferred that the direction of opening of the movable portion has at least a substantial vertical component when a container incorporating the device is upright, so that it can fall open under its own weight and that of liquid trapped above it to let said liquid escape back into the container. The movable portion may be at, or constitute, an end wall of the chamber distal from the outlet.

It either aspect of the invention, a preferred construction includes a one-piece cap member through which the outlet opens, having means such as a peripheral skirt for fitting or screwing it into the neck of a container. A second one-piece component constituting the chamber for containing the obturator is secured against an inner side of the cap member e.g. by being a snap fit past a peripheral skirt part thereof. Where there is a hinged movable wall portion of the chamber, this is preferably moulded in one piece with the second component.

BRIEF DESCRIPTION OF THE DRAWINGS

By way of example, embodiments of the invention will now be described with reference to the drawings, in which.

DETAILED DESCRIPTION OF PREFERRED EMBODIMENTS

Figure 1:
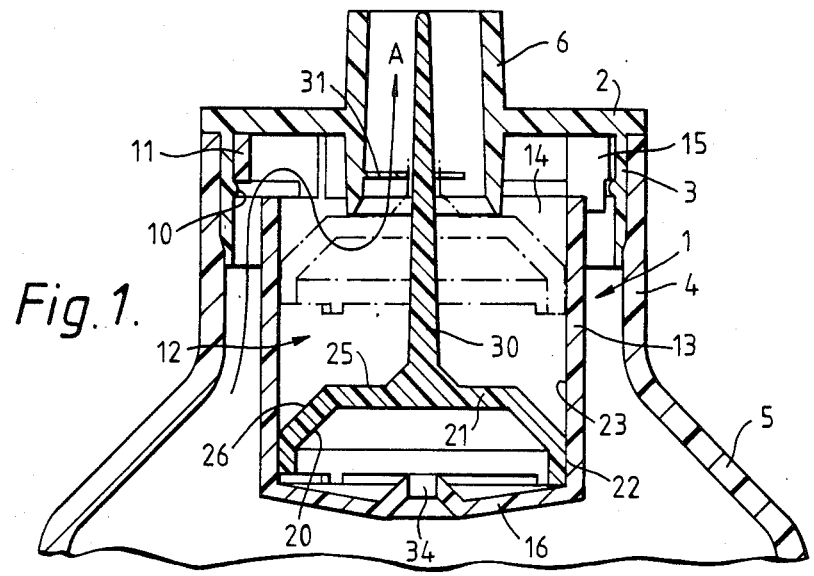
FIG. 1 is a vertical section through the top of a first embodiment, being a squeeze bottle fitted with a dosing device having a slidable piston.
Figure 2:
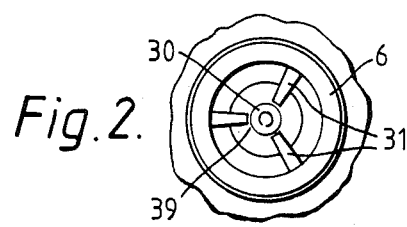
FIG. 2 is a fragmentary plan view down an outlet of the frist embodiment.

Referring to FIGS. 1 and 2, a dosing device indicated generally at 1 comprises a flat circular cap member 2 with a downwardly projecting integral cylindrical skirt 3 extending around its underside near its edge. The skirt 3 is an interference fit in the cylindrical neck 4 of a plastic squeeze bottle 5 for containing a liquid to be dispensed, e.g. washing-up liquid. The center of the cap member 2 is penetrated by a coaxial cylindrical outlet tube 6, of diameter approximately one-third that of the bottle neck 4, that projects axially to approximately equal extents above and below the cap member 2.

A projecting bead 10 extends circumferentially around the inner surface of the skirt 3 and behind this, i.e. between bead 10 and cap member 2, is snap-fitted a securing ring 11 of a piston/cylinder assembly generally designated 12. The cylinder 13 of this assembly is of somewhat smaller diameter than the securing ring 11 but nevertheless occupies a substantial proportion of the bottle neck cross-section. It is mounted coaxially with the ring 11, so as to extend beneath it down into the container 5, by equally spaced legs 15 that extend between the periphery of an open front end 14 of the cylinder to points correspondingly spaced around the ring 11. Cylinder 13, legs 15 and ring 11 constitute a one-piece plastics moulded part of e.g. polyethylene, as do the cap member 2, outlet tube 6 and skirt 3. The rear end of the cylinder 13, i.e. that end remote from the outlet tube 6, is substantially closed off by an integral shallow frusto-conical wall 16 with a small central circular aperture 34.

Contained and axially slidable in the cylinder 13 is an obturator piston 20 with a cup-shaped main body 21 of flattened external shape, the axial depth of its peripheral cylindrical surface 22 against the inside surface 23 of the cylinder 13 being much less than its diameter. This is in order to keep down frictional resistance to the piston's sliding in the cylinder, in which it is moderately close fit. The piston has a flat circular front surface 25, joined to the peripheral cylindrical surface 22 by a forwardly tapering frusto-conical surface portion 26, from the center of which projects forwardly a long thin integral stem 30. The stem 30 is circular in second and slightly tapering towards its free end, which extends up through the centre of the outlet tube 6.

In FIG. 1 the device is shown in its rest position, with the piston resting on the rear wall 16 of the cylinder 13 and the tip of its projecting stem 30 just reaching the exterior opening of the outlet tube 6. At the other extreme of its stroke, shown by the broken lines in FIG. 1, the front surface of the piston 20 can abut substantially sealingly against the rear end edge of the outlet tube 6 to shut it off and thereby prevent any further dispensing of liquid, with the stem 30 projecting substantially outwardly of the exterior opening of the tube 6.

With reference now also to FIG. 2, in the rear end of the outlet tube 6 there are three thin inward radially projecting prongs 31 whose inner ends define an opening 39 trapping and guiding the piston stem 30 along the axis of the outlet, and thereby preventing the flat piston body 21 from tilting out of alignment in the cylinder 13.

The dosing operation of the device is as follows —the following description is also relevant to subsequent embodiments except where explained otherwise. A user turns the bottle 5 to a state sufficiently inverted for its liquid contents to flow into its neck 4, and squeezes it to pressurize the contents. The pressurized liquid is thus forced out of the container 5 along an outlet passge that involves passing through the annular space between cylinders 13 and container neck 4, through the apertures between the cylinder support legs 15, radially inwardly past the front edge of the cylinder and then back into the cylinder 13 to negotiate the rearwardly projecting portion of the outlet tube 6, before finally passing down that tube out of the container. Arrow "A" in FIG. 1 shows this. When the container is first squeezed liquid also starts to be forced into the space behind the piston body 21 in the cylinder 13, through the small aperture 34, and this liquid drives the piston 20 towards the outlet tube 6 until it abuts against the rear end of the tube 6 and shuts it off. The piston 20 is driven forward because of the pressure differential between its front and rear surfaces. Its rear surface feels a liquid pressure substantially equal to that in the container, although the rate at which the volume behind it increases is limited by the size of the small aperture 34. The piston's front surface 25, 26 feels a lower pressure because of the rapid flow of liquid from the outlet tube 6 but, because all liquid passing from the container 5 out through the outlet tube 6 must negotiate the convoluted outlet passage and therefore be directed back into the cylinder 13 to exert back-pressure on the piston front surface 25, 26, this lower pressure competes against the higher rear pressure in a way that is found to be consistent and has little dependence on the previous state of the device. With a conventional obturator/cylinder device, there would for example be a tendency for a first dose after a long period of inactivity —leaving the cylinder empty —either to be much smaller than normal because the obturator has nothing in front of it to resist its progress, or to be too large because the piston has been stuck in the cylinder by dried liquid product. In the presently described device there will always be a back pressure on the piston 20 because the dispensed liquid itself is directed back against it, although the dispensed volume is not determined by the swept-out cylinder volume. It has been found that the device described gives a dose that shows a good independence of dose volume on variation of squeeze/dispensing pressure used. Moreover, because the guide projections 31 for the stem 30 are positioned well away from the exterior opening of the outlet tube 6, and present a very small surface area to the stem 30, there is little chance that drying-up of liquid in the device will stick the stem 30 to the projections 31 sufficiently to jam the piston 20. After each dose has been dispensed, the projecting stem 30 can be used to push the piston 20 back to its starting position so as to reduce the time that would be needed between doses if it were to fall back under its own weight alone.

Figure 3:
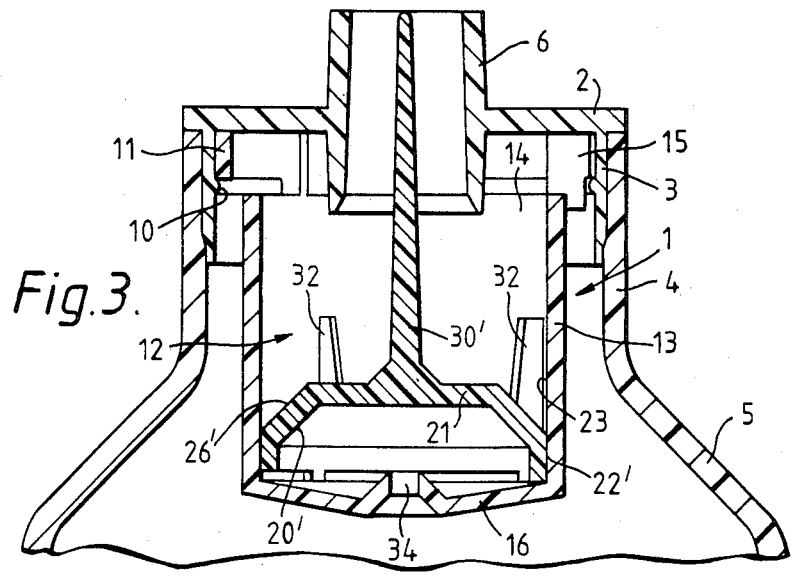
FIGS. 3, 4 and 5 are sectional views, similar to that of FIG. 1, showing second, third and fourth embodiments with different forms of piston.

FIG. 3 shows a second embodiment similar in most respects to the first, the piston 20' having a similar forwardly-projecting stem 30. However here there are no guiding projections to engage the stem; it serves only as a means for pushing the piston 20' back into its retracted position after each dose (and, by its visibility, indicating that the device is working). Stability for the piston 20' is provided instead by a number of flat fins 32 —three in this case —spaced equidistantly around its periphery and projecting axially forwardly along the cylinder wall 23 from the outer frusto-conical surface 26' of the piston 20'. The fins 32 present only thin edges to the cylinder wall 23, so that the additional frictional surface presented is minimal even though each fin 32 is axially twice as deep as the piston's peripheral cylindrical surface 22', giving the axial alignment stability of a piston three times the length. Also, because the fins 32 are located in the cylinder 13 well away from the outlet 6, they are less susceptible to sticking should the outlet dry up for some reason.

Figure 4:
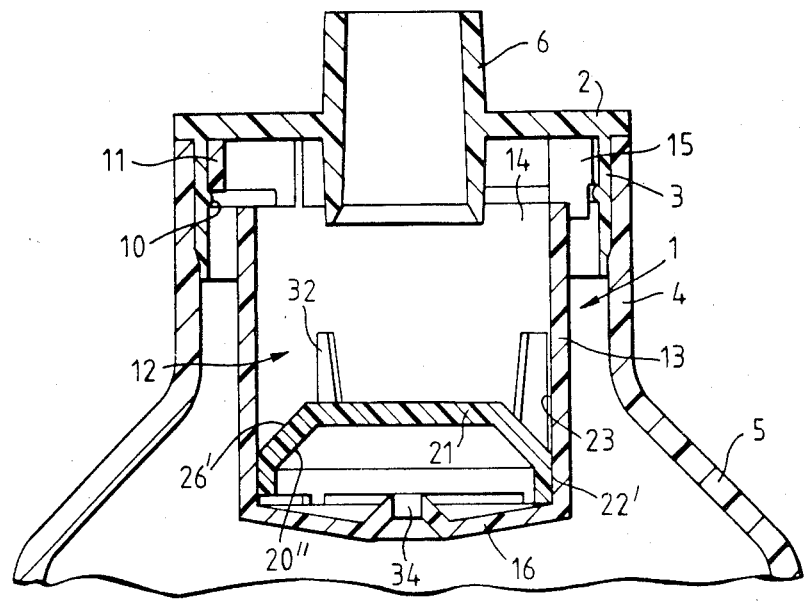

FIG. 4 shows a third embodiment similar to the second but lacking the projecting stem on the front of the piston 20''. This enables a simpler device and a slighter faster flow rate through the unobstructed outlet tube 6, which rate can if wished by compensated by having a correspondingly slightly larger hole 34 at the other end of the cylinder 13. In this version the piston 20'' has to return to its start position without direct assistance, so it is more suitable for use with low viscosity liquids if rapid successive doses are required.

Figure 5:
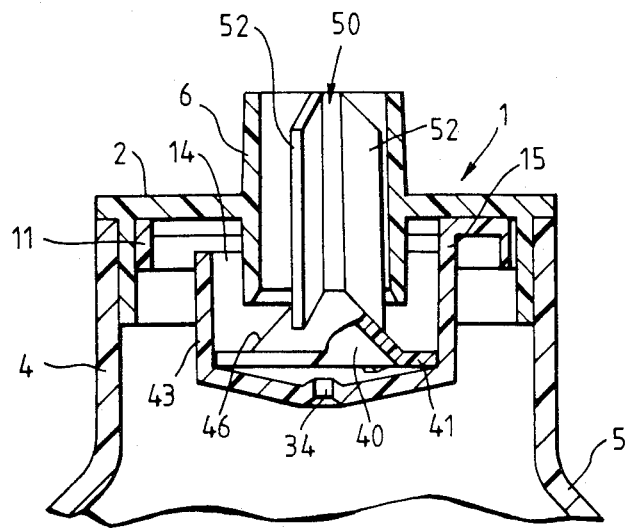

The fourth embodiment, shown in FIG. 5, is again similar in general structure and operation to the first three, corresponding parts being indicated by corresponding reference numbers. However the cylinder 43 is axially shorter than those seen previously and its axial overlap with the outlet tube 6 is for almost half its length, so that the outlet passage convolution extends well back into the cylinder. The main body of the piston 40 is a relatively thin and flat outer annular portion 41 with an integral frusto-conical front surface 46 tapering substantially to an integral forwardly projecting stem 50. The stem 50 is loosely engaged in the outlet tube 6 so as to guide the piston's motion more or less linearly, by three spaced longitudinal fins 52 which serve to centre the stem 50 but also allow liquid to flow between them and out of the outlet.

Figure 6:
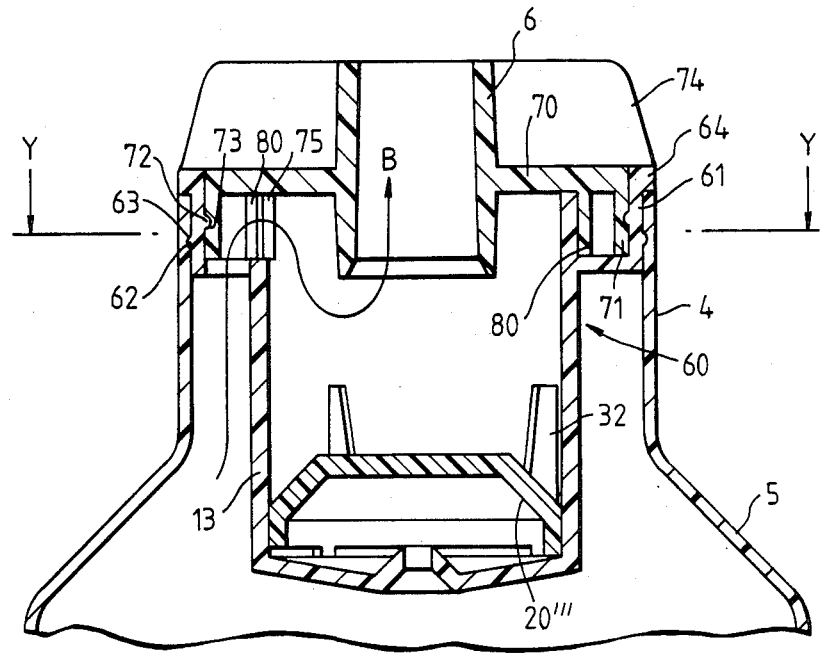
FIG. 6 is a vertical section on X—X (FIG. 7) through the top of a fifth embodiment, similar to the third embodiment but with additional means for varying the dose dispensed.
Figure 7:
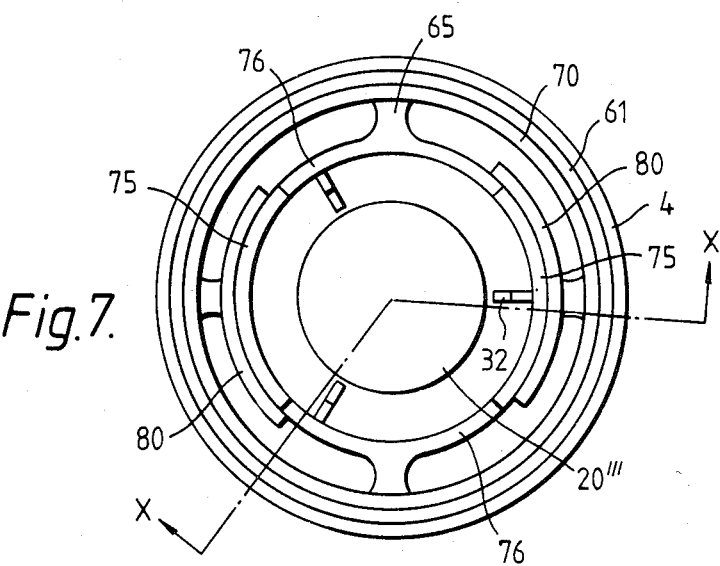
FIG. 7 is a horizontal section on Y—Y (FIG. 6) of the fifth embodiment.

FIGS. 6 and 7 show a fifth embodiment with a piston 20''' and cylinder 13 which are the same as in the third embodiment (FIG. 4). However there is a different construction of the cap member and cylinder securing ring allowing for convenient variation of the dose metered by the device.

The one-piece moulded component 60 comprising the cylinder 13 is fitted and secured directly into the neck 4 of container 5 by means of a cylindrical outer securing skirt 61 that fits tightly inside the top of the container neck 4 and is held axially in place by engagement of a circumferential outward ridge 62 around its surface in a circumferential inwardly-opening groove 63 of the neck 4, and a narrow flange 64 extending radially outwardly from the top of the skirt 61 and resting on the top edge of the neck. The cylinder 13 depends from this skirt 61 on four equally spaced narrow radial support struts 65, the device also comprises a flat circular cap member 70 with a downward peripheral skirt 71 which here is a snap-fit inside the upwardly projecting skirt 61 of the cylinder component 60. An inwardly projecting circumferential bead 72 around the outer skirt 71 engages an outwardly-facing corresponding groove 73 of the inner, cap member skirt 71 to hold these two components together axially while allowing them to be rotated relative to one another. A pair of flat radial ears 74 on the outside of the cap member 70 enables this rotation to be done conveniently by hand.

At two opposing regions, each subtending 90°, the front edge of the cylinder 13 projects upwardly above the struts 65 in a cylindrical-segment skirt portion 75 that extends right up to the flat cap member 70. Between these skirt portions 75 are defined 90° window regions 76 where the cylinder edge is in axial register with the strut 65. Radially just outside the upwardly projecting skirt portions 75 of the cylinder component are two corresponding downwardly projecting shutter skirts 80, likewise of 90° angular extent and integral with the cap member 70. In the rotational orientation shown in the figure the outer shutter skirts 80 substantially overlap the inner, cylinder skirts 75 so that the window regions 76 are left substantially open for outflow of liquid along two paths exemplified by arrow "B" in FIG. 6. However, by using the ears 74 to rotate the cap member 70, the shutter skirts 80 can block the window regions 76 to any desired extent thus conveniently controlling the flow rate through the outlet passage and thereby the size of dose that can be dispensed for each stroke of the piston 20'''. It will be seen that this adjustable flow rate construction can be used with any of the piston configurations already described, and not just with that of the third embodiment.

Figure 8:
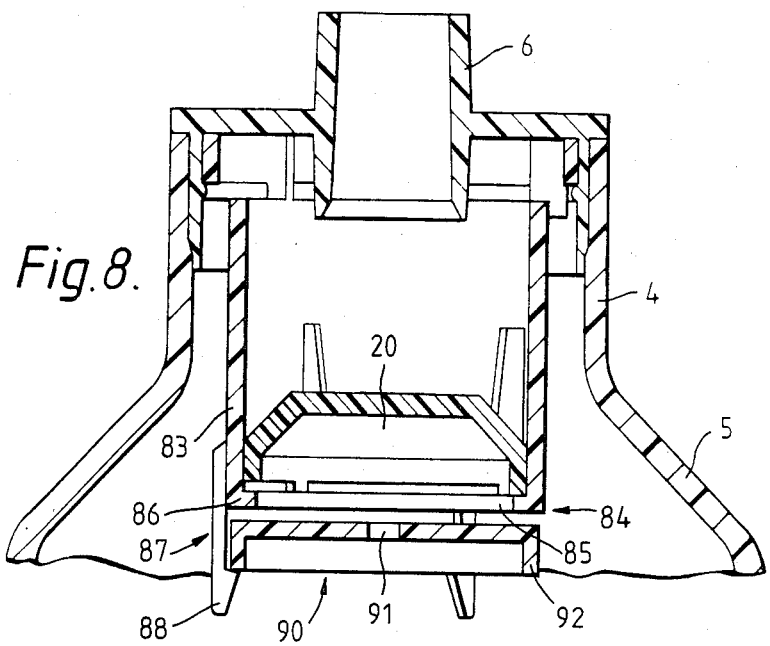
FIG. 8 is a vertical sectional view of a sixth embodiment including a separate cylinder end plate for rapid piston restoration.

FIG. 8 shows a device, being a sixth embodiment of the invention, which is adapted to provide for rapid restoration of the obturator member to its starting position without providing means such as a stem for pushing on it directly. It is desirable to provide some such means for rapid restoration since, particularly with viscous liquids, leakage of liquid through the small hole back into the container tends to be slow. Doses made in rapid succession will thus tend to be too small. To combat this the sixth embodiment —which otherwise has a general piston/outlet passage set-up similar to the third embodiment (FIG. 4) —has a cylinder 83 whose end 84 remote from the outlet tube 6 has a large circular opening 85 across almost its entire area. Only a narrow inwardly-projecting lip 86 is provided around the opening, so as to prevent the piston 20 from escaping from the cylinder altogether. Extending axially rearwardly from around the rear edge of the cylinder 83, and evenly spaced around this edge, are three retaining and guide members 87. Each of these comprises a straight bar with an inturned hook portion 88 at the end, and between them they retain and guide a loose circular plate 90 that constitutes a movable wall portion of the cylinder 83. The plate 90 is dimensioned to cover the circular opening 85, abutting substantially sealingly against the lip 86, and in its centre has a small circular aperture 91. The plate edge has an integral downturned skirt portion 92 to reinforce it against deformation.

When dispensing using this sixth embodiment, the container inversion causes gravity and the rush of liquid together to bear the plate 90, guided by the guide members 87, onto the end of the rest of the cylinder 83, thus shutting off the space behind its piston 20 save for the small aperture 91. The dispenser piston then works as previously described to produce a dosing effect. After each dose, however, the container and device are righted whereupon gravity and the liquid in the cylinder 83 behind the piston 20 carry the plate 90 back down onto the retaining hooks 88 of the guide members 87 and clear of the large opening 85, through which liquid can then fall rapidly back into the container and the piston be restored correspondingly rapidly to its starting position.

Figure 9:
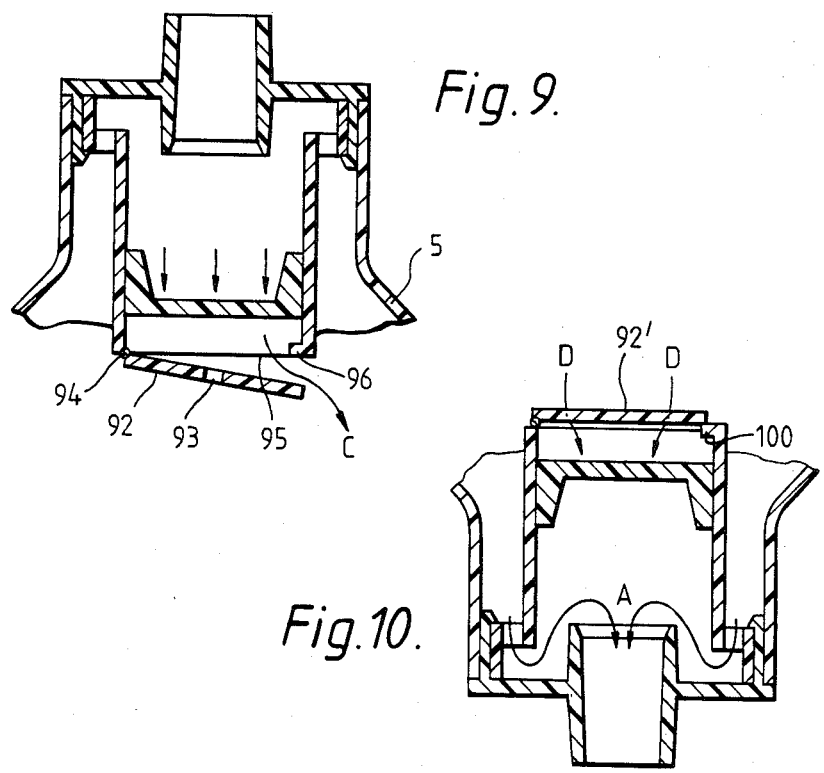
FIG. 9 is a simplified sectional view of a seventh embodiment with a hinged cylinder flap, showing restoration of the piston.
Figure 10:
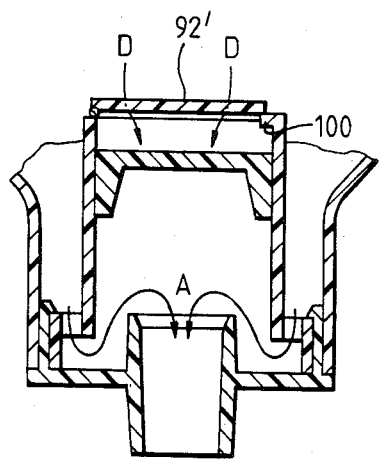
FIG. 10 is a simplified sectional view of a variant of the seventh embodiment, during dispensing.

FIGS. 9 and 10 respectively show a seventh embodiment and a variant thereof, both adapted for rapid restoration of a piston in manners broadly corresponding to the sixth embodiment described above. The piston, cylinder and outlet constructions are shown simplified but may in practice be the same as in the sixth embodiment except as particularly described below. The FIG. 9 device has a cylinder with a movable plate 92 having a small central aperture 93 at its rear end, as in the previous embodiment. However the plate 92 is not loose but integrally hinged at one side 94 to a rear edge part of the cylinder. When dispensing, therefore, it can swing to cover a large opening 95 at the rear of the cylinder —abutting on a projecting lip 96 for retaining the piston in the cylinder —to provide the dosing effect. When the container is righted the plate can flap open as shown in FIG. 9 to allow rapid escape of liquid through the large opening 95 (arrow "C") and thereby rapid restoration of the piston.

The FIG. 10 variant (shown in dispensing mode) is similar to that of FIG. 9 except that there is no small hole in the swinging flap or plate 92'. Instead of a peripheral lip the rear cylinder edge has a irregularity or isolated projection 100 which prevents the plate 92' from completely closing off the large rear opening 95'; a narrow space is always left between the edges of the plate 92' and the cylinder, and this functions as a restricted opening to provide the dosing effect, as shown by arrows "D" in the Figure.

Figure 11:
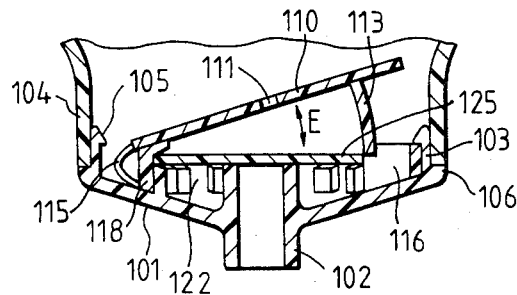
FIG. 11 is a vertical sectional view of an eighth embodiment incorporating a loose flap as an obturator.
Figure 12A:
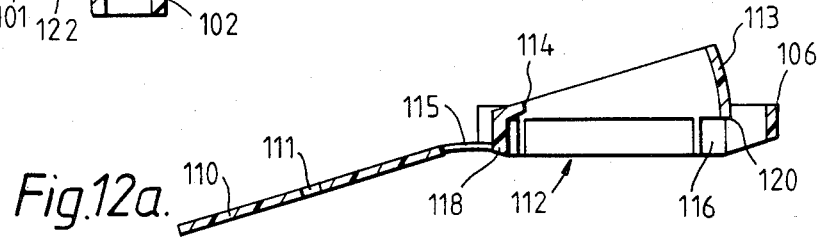
FIGS. 12a and 12b are respectively vertical sectional and plan views of a first one-piece component of the eighth embodiment.
Figure 12B:
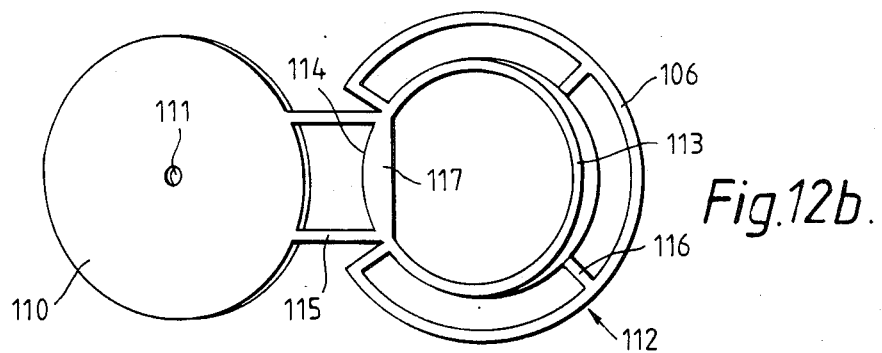
Figure 13B:
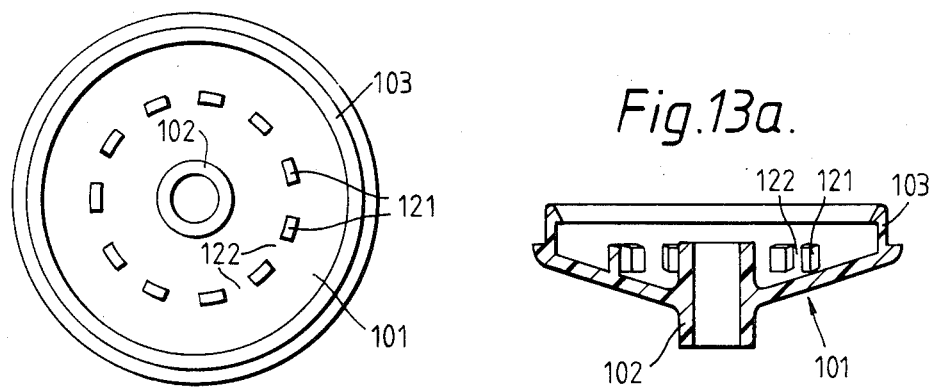
FIGS. 13a and 13b are respectively vertical sectional and plan views of a second one-piece component.
Figure 13A:
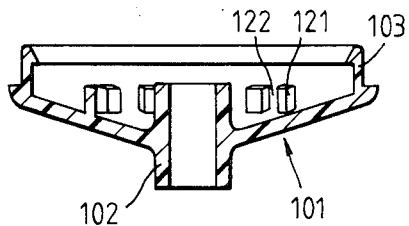

FIGS. 11 to 13 illustrate an eighth embodiment in which the various components of the device have configurations substantially different from those described above. The dosing device comprises a frustoconical cap member 101 penetrated by a central outlet tube 102, with a cylindrical skirt 103 depending from near its edge so as to be an interference fit in the neck 104 of a container. The edge of the skirt 103 carries an inward circumferential ridge 105 behind which is snapfitted a three-quarter ring 106 of a one-piece moulded chamber component 107, seen as a single moulding in FIGS. 12a and 12b.

The chamber component 107 comprises two main parts, a flat circular flap with a small central aperture 111, and a stationary part 112 comprising a chamber wall 113 having substantially the shape of a short segment of a circular toroidal tube, tapering to almost zero axial depth on a hinged side 114 thereof, at which side it is connected to the circular flap 110 by two thin strips forming a hinged connection 115 between the two parts. The flap 110 is larger in diameter that the rear edge of the chamber wall 113 and can fall over it to close it off, forming a movable rear wall to the chamber as seen in FIG. 11. Spaced equidistantly around the front edge of the chamber wall 113 are four radial supporting legs 116 extending outwardly to the three-quarter ring 106 that supports the chamber component in the device. The three quarter ring 106 extends around the chamber wall except for the quarter adjacent the hinged side 114, at which side the chamber wall has two flanges 117, 118 projecting respectively inwardly and downwardly. When snapped into position in the cap member 101 the plane of the rear opening of the chamber wall 113 is inclined to the radial plane of the device, while the front opening however lies in a radial plane with its edge 120 in axial register with the rear opening of the outlet tube 102 and adjacent the ends of a circular array of spaced lugs 121 that project rearwardly from the cap member 101 and are disposed coaxially around its outlet tube 102. Liquid dispensed through the device must pass through windows 122 defined between these lugs 121 on its way to the outlet.

The obturator used in this embodiment is not a piston but a plain flat plastic disc 125 which on the hinge side 114 of the chamber is trapped between one of the lugs 121 and the inward flange 117 on the chamber wall 113. The disc 125 can make swinging movement between the front and rear of the chamber (arrow "E"); in the foremost position shown in FIG. 11 it rests against the rear edge of the outlet tube 102 to block it off.

In the upright condition, with the device pointing upwards, the flap 110 hangs open on its hinge 115 while the disc 125 takes up a rearmost position adjacent the rear opening of the chamber 113. The disc is however gripped so that it cannot actually fall out. On inverting and squeezing the container to dispense liquid the flap 110 is carried onto the rear edge of the chamber 113 to close if off save for the small aperture 111. Dosing operation via the convoluted outlet then takes place much as described above, with the disc 125 eventually being pressed against the outlet tube 102 to finish the dose. Rapid restoration of the disc 125 to its starting position is provided by the flap 110 hinging away from the chamber 113 as the container is righted, allowing liquid to fall back quickly.

Figure 14A:
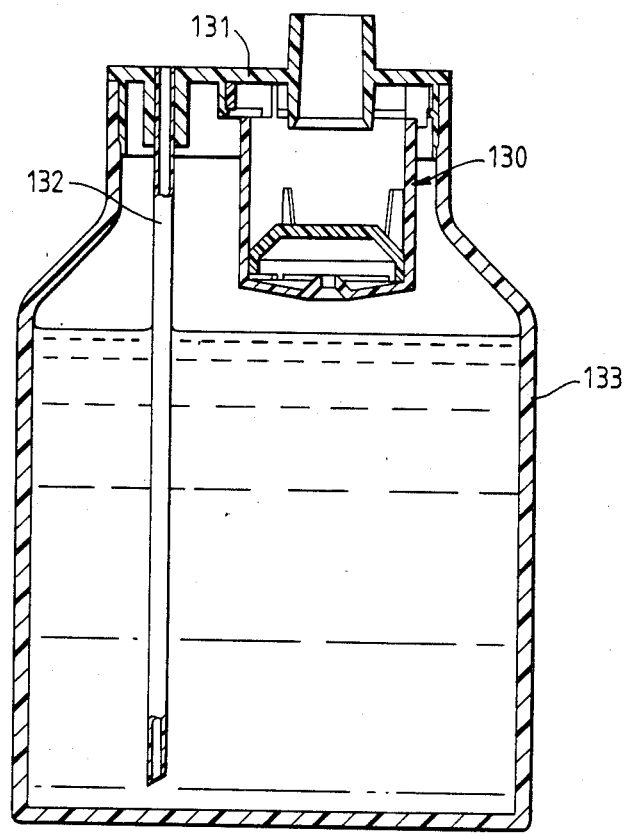
FIGS. 14a and 14b are vertical sectional views of a dosing device, similar to that of the third embodiment, incorporated in a rigid container, in upright and dispensing positions respectively.
Figure 14B:
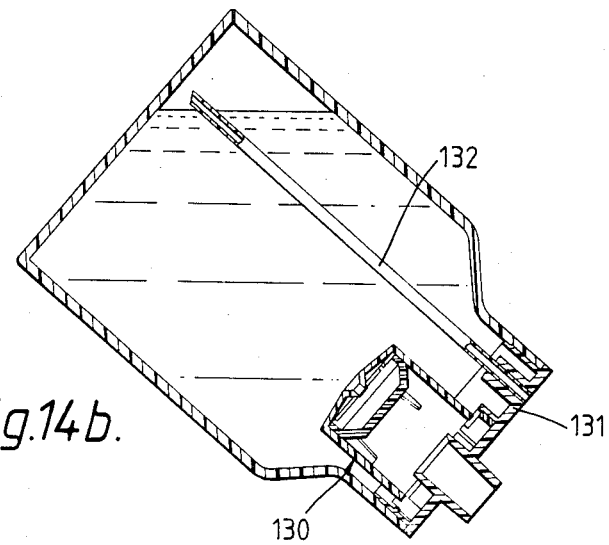

FIGS. 14a and 14b show the use of a dosing device generally indicated at 130 and similar in most respects to that of the third embodiment described above (FIG. 4), but used in a rigid, nonsqueezable container. The cap member 131 of the device has been extended to incorporate a vent tube 132 that extends almost to the bottom of the container 133, which tube 132 is for admission of air to compensate for the volume of liquid dispensed. FIG. 14b shows the assembly in the dispensing position, in which it can be seen that the inner end of vent tube 132 is clear of the liquid surface and so liquid does not escape through it. It is found that the dosing device embodying the inveniton works quite well in a nonsqueezable container provided that the liquids concerned are of fairly low viscosity, e.g. water.

Figure 15:
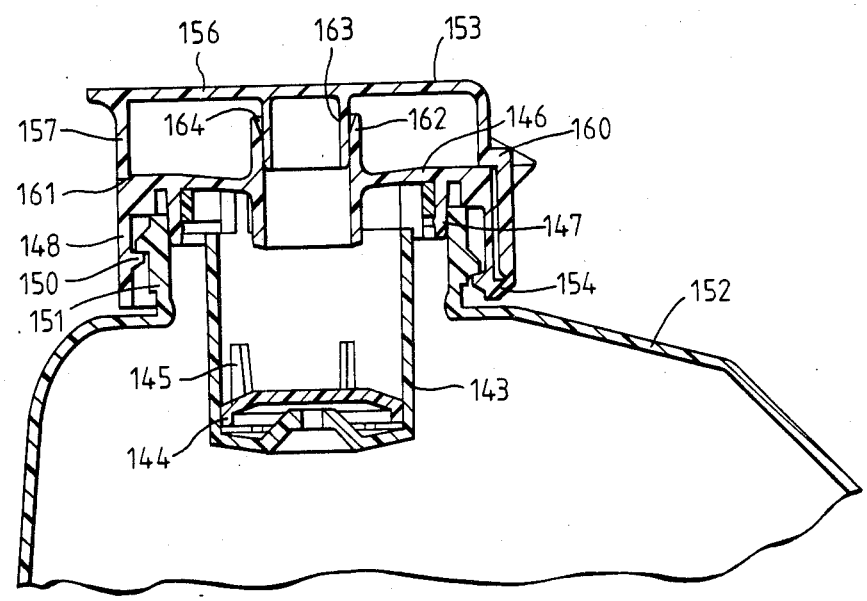
FIG. 15 is a vertical section of an eighth embodiment including a lid and a screw-fitting.

Finally, FIG. 15 shows an eighth embodiment whose cylinder 143 and piston 144 are again the same as those of the third embodiment, the piston 144 having axial fins 145 to stabilize it. In this embodiment however the circular cap member 146 has, in addition to a cylindrical skirt 147 for retaining the snap-in cylinder assembly as previously, an outer, longer peripheral skirt 148 with an internal screw-necked container 152. When the device is in position the rim of the container neck lies between the inner and outer skirts 147, 148.

The cap member 146 is formed as an integral one-piece moulding with a flip-top lid 153, hinged to the cap member by being continuous with the bottom edge of its outer skirt 148 on one side at a hinge portion 154. The lid 153 comprises a side portion 155 doubling back up the skirt 148 from the hinge 154 and having an inturned shoulder 160 that can snap over the top periphery of the cap member 146 to retain the lid in the closed position. Away from side portion 155 the lid comprises a circular top plate 156 with a peripheral cylindrical skirt 157 whose edge hits a peripheral groove 161 around the cap member's periphery; the skirt 157 is of a height to keep the top lid plate 156 clear of the outwardly projecting outlet tube 162 of the device. To the centre of the plate 156 there is however a short downwardly projecting stopper tube 163 which in the closed portion of the lid fits closely in the outlet tube's outer lid to seal it off and prevent leakage of liquid into the lid and drying of liquid in the device. The outer end of the outlet tube 162 has a slightly flaring bore 164 to guide the stopper tube 163 into place as the lid is closed.

We claim:

1. A dosing device for dispensing liquid from a container, the device comprising:
   (a) a front part having an outlet opening;
   (b) means for providing a chamber in the device rearwardly adjacent the outlet opening, the chamber having a front opening facing the outlet opening of the device;
   (c) an outlet passage for liquid being dispensed to flow from the container to the outlet opening around the chamber;
   (d) an obturator fitting in the chamber and movable therein to a forward position blocking the outlet passage;

(e) means located in said means for providing a chamber for permitting only a restricted flow of liquid from the container into the chamber behind the obturator to influence the movement of the obturator towards the forward position during dispensing of liquid; and (f) a part providing a convolution of the outlet passage forwardly of the obturator, said convolution-providing part projecting from the front part rearwardly towards the obturator, and having a radially outwardly facing surface for directing a flow of liquid through the outlet passage rearwardly through the front opening of the chamber against the obturator, to exert a back pressure thereon during dispensing.

2. A dosing device according to claim 1 wherein the convolution-providing part is a tube projecting rearwardly from around the outlet opening.

3. A dosing device according to claim 2 wherein said forward position the obturator seats on the tube to block the outlet passage.

4. A dosing device according to claim 1 wherein the convolution-providing part extends through the front opening of the chamber to overlap therewith.

5. A dosing device according to claim 4 wherein the convolution-providing part is a tube projecting rearwardly from around the outlet opening.

6. A dosing device according to claim 5 wherein the tube and chamber are both substantially cylindrical.

7. A dosing device according to claim 1 wherein the obturator is a piston linearly movable in the chamber.

8. A dosing device according to claim 7 wherein the piston has an axially projecting guide portion, and the device has at least one alignment part within the outlet opening, the guide portion engaging the alignment part to maintain alignment of the piston axis in the chamber.

9. A dosing device according to claim 7 wherein the piston comprises a plurality of axially extending fins spaced around the periphery thereof, to maintain alignment of the piston axis in the chamber.

10. A dosing device acording to claim 1 wherein the obturator is a flat flap swingable in the chamber.

11. A dosing device according to claim 1 wherein the front part and chamber are relatively rotatable with respect to one another, the front part comprising a cylindrical skirt extending rearwardly towards the chamber front opening, and the periphery of the chamber front opening having a cylindrical skirt extending forwardly towards the front part, one said skirt having window regions in the outlet passage and the other said skirt having shutter portions in axial register with said window regions, the skirts being coaxial whereby in dependence on the relative rotational orientation of the front part and chamber shutter portions cover the window regions to a variable extent controlling the flow rate of liquid through the outer passage.

12. A dosing device for dispensing liquid from a container, the device comprising:

(a) a front part having an outlet opening;

(b) means for providing a chamber in the device rearwardly adjacent the outlet opening, the chamber having a front opening facing the outlet opening of the device;

(c) an outlet passage for liquid being dispensed to flow from the container to the outlet opening around the chamber;

(d) an obturator fitting in the chamber and movable therein to a forward position blocking the outlet passage;

(e) means located in said means for providing a chamber for permitting only a restricted flow of liquid from the container into the chamber behind the obturator to influence the movement of the obturator towards the forward position during dispensing of liquid; the means for providing the chamber comprising a fixed chamber wall portion and a rear, movable chamber wall portion which is movable, upon inversion of the container to a dispensing position, to a closed forward condition wherein only said restricted flow of liquid is permitted from the container into the chamber through said means for permitting a restricted flow of liquid and when the container is upright, under gravity to a restoring rearward condition wherein a large aperture is defined between the fixed and movable wall portions enabling rapid draining of liquid from around the obturator.

13. A dosing device according to claim 12 wherein said means for permitting only restricted flow are provided by a small aperture in the movable wall portion.

14. A dosing device according to claim 12 further comprising retaining and guide means on the fixed chamber wall portion for retaining and guiding said movable wall portion, the movable wall portion comprising a separate plate retained and guided by said guide means.

15. A dosing device according to claim 14 wherein said means for permitting only restricted flow are provided by a small aperture in the separate plate.

16. A dosing device according to claim 12 wherein the fixed chamber wall portion has a rear edge and hinge is positioned to connect the movable wall portion pivotably to said rear edge.

17. A dosing device according to claim 12 wherein the obturator is a flat flap swingable in the chamber.

* * * * *